Sept. 24, 1935.                D. I. THOMAS                2,015,388
              TREATMENT OF CEREALS FOR ANIMAL AND HUMAN CONSUMPTION
                        Filed May 11, 1931        2 Sheets-Sheet 1

INVENTOR
David Idwal Thomas
BY
Kenyon Kenyon
ATTORNEYS

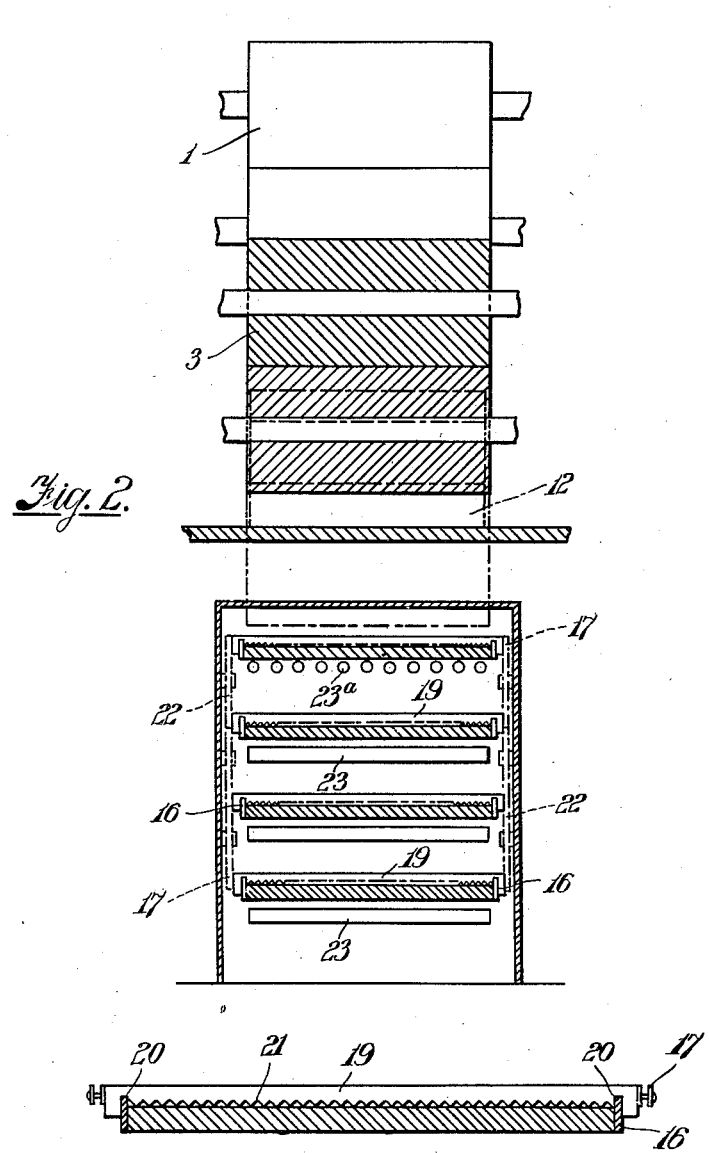

Patented Sept. 24, 1935

2,015,388

UNITED STATES PATENT OFFICE 2,015,388

TREATMENT OF CEREALS FOR ANIMAL AND HUMAN CONSUMPTION

David Idwal Thomas, Penygraig, Wales

Application May 11, 1931, Serial No. 536,487
In Great Britain November 20, 1930

10 Claims. (Cl. 99—11)

This invention relates to a new or improved process for the treatment of cereals intended for animal and human consumption and has more particular reference to a method of and means for sterilizing same in order that the material treated may keep in good condition during a period of storage.

All edible grain and other seeds coming generally under the term cereals are rich in nitrogenous and other vitalizing products and for this reason are chosen by natural instinct by innumerable insects for the deposit of their eggs and for the hatching out of their larvæ, the state of development of the ova at thrashing time being mainly or wholly dependent upon the nature of the grain, the weather and temperature conditions prior to harvesting, and the period elapsing between the ripe stage and storage. Thus, like crops even from the same locality will vary greatly in their keeping qualities, and it is difficult, if not impossible, to form any prior judgment in this respect. Further, most cereals are subject to fungoid growths such as mould and rust and the starch and protein matters contained in the grain are also subject to fermentative change whereby the nutritive properties are impaired or even rendered valueless or deliberately harmful.

Now, the object of the present invention is to destroy as far as is possible, all trace of ova or insectivorous life, and to then sterilize the product under treatment so that grain or kindred cereal products may be stored or kept indefinitely without the addition of any preservatives whatsoever, and the invention consists in applying, firstly a mechanical crushing to destroy ova or larvæ, and to follow immediately this crushing process with a heat sterilizing influence whereby every particle is subjected to the temperature level of a critical heat zone, and all moisture and other vapor products evolved from the sterilizing process removed as they become evident from the drying zones. As it will be obvious that a small portion of cereal escaping correct treatment will form a pollution centre in any stored mass, it is an essential part of the process that the whole of the product treated be subjected to the preliminary crushing process and that every such particle is subjected to the critical temperature of sterilization and this essential necessity underlies the design of the plant and process hereinafter described and is capable of application to whole grain or grain that has been treated for the removal of husk or bran.

Whilst the problem set out above is by no means any new discovery it has been customary in many cases to add to the treated grain a preservative or inhibitor of larvæ or fermentative growth such as salt, benzoic acid or salts, borax, salicylic acid or kindred material, but any acid addition or oxidizing influence tends to degrade the starch contents, and all such inhibitors certainly destroy very materially the vitamin and nutritive property of the cereal. A feature of the present invention is that no addition of any kind is introduced to the product under treatment, so that the whole food value of the original material is available to the consumer and no degradation ensues between treatment and use.

Reference will now be made to the accompanying drawings which illustrate diagrammatically and by way of example an apparatus suitable for carrying the invention into effect and in which:—

Fig. 2 is a cross section of Fig. 1 on line A—B and

Fig. 3 shows a detail of the serrated conveyor bar.

Figure 1:
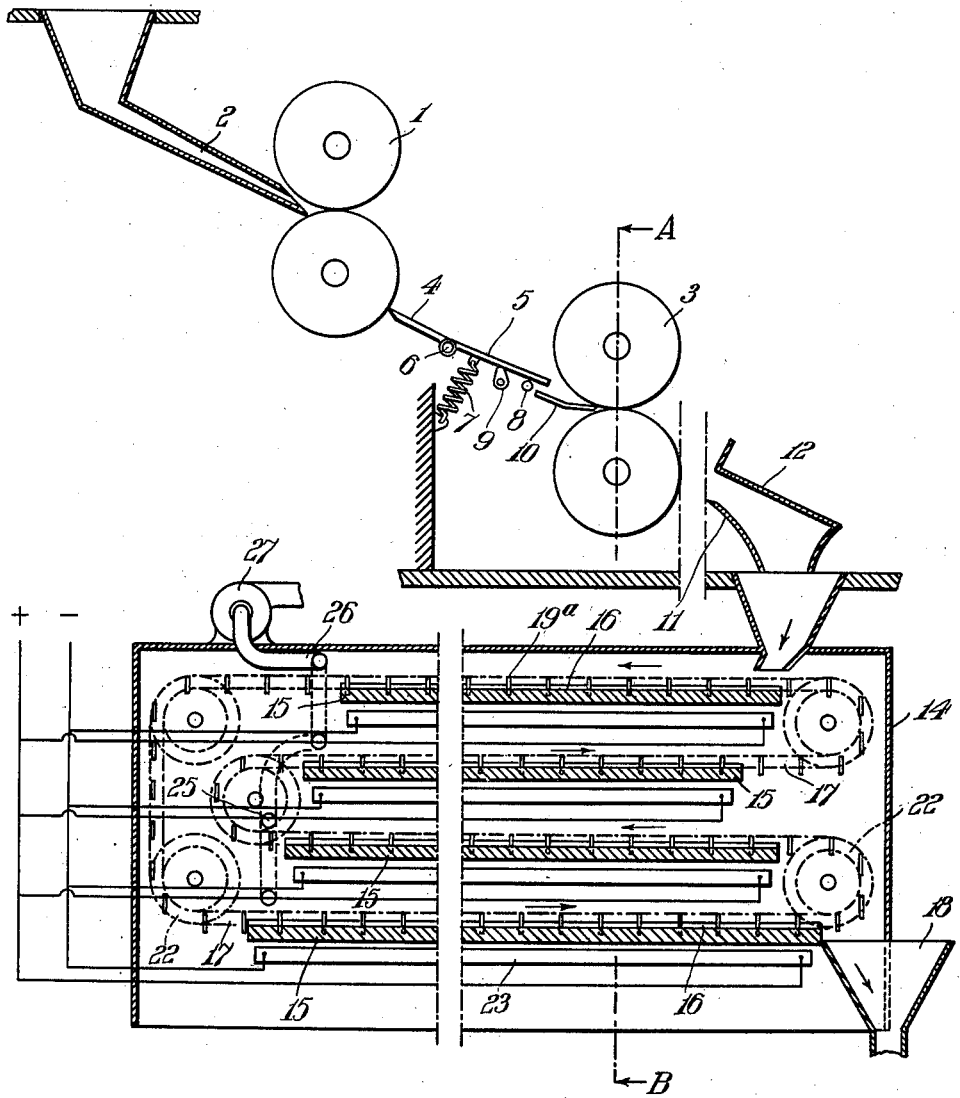
Fig. 1 shows in elevation the crushing and sterilizing apparatus.

Referring to the drawings, the cereal under treatment, after a preliminary and known cleansing process, is fed to crushing rolls 1, by means of a tapering chute 2 the sides of all rolls being housed or shrouded to prevent any grain passing to the next stage without treatment. These rolls 1 may be preliminary rolls and employed only for sizing the particles or flakes to be further crushed, the product after such first rolling being presented in a fine even stream to a second or third rolling, care being taken that the flakes formed by the first rolls 1 are fed to the second or third rolls 3, flat-wise. This may be accomplished by means of a scraper feeding the crushed product from the rolls 1 to a shaking table 5 hinged at 6 and moved against the action of a spring 7 to and from a rest bar 8 by a cam 9, the product being fed from the table 5 onto plate 10 and from thence to the rolls 3. These rolls may be succeeded by a similar set of rolls (not shown) supplied also with crushed product by a similar feeding device. As the ova size may be as small as $$\frac{1}{10,000}$$

of an inch, it is necessary that the final crush rolls, are set so that there is absolute contact at all points prior to crushing, and to ensure that all grain is subjected to the necessary pressure these last rolls are provided with heavy spring controlled bearings, and are heated to a temperature of about 100 deg. C. pressure as well as fineness of rolling being relied upon to effect ova disintegration. Any or all of the rolling operations may be followed by customary screening for the purpose of intercepting ova as the material leaves the rolls. A scraper 11 forming a lip of an enclosed hopper 12, removes the crushed grain from the lower roll 3 and delivers it through the hopper in flake form uniformly to the sterilizing apparatus or oven 14. The oven 14 consists of a rectangular enclosed framework, heat insulated externally and provided with a series of metal platforms or tables 15, running lengthwise of the oven. The tables are arranged in parallel relationship in the vertical plane, and lie horizontally across the entire length of the oven. The tables 15 are provided with side pieces 16 and a continuous link belt conveyor chain 17 is adapted to progress the mass gradually along the length of the uppermost table, and feed it continuously along the surface of the tables until it is discharged into a hopper 18 which delivers the product into any suitable means for packing or storage. The conveyor belt 17 is generally of a known type, but has the following special features:—The conveyor bars 19 are slotted as at 20 to accommodate the end pieces 16 of the table 15, and are preferably serrated over their length as at 21 the serrations of one such bar 19 being staggered in relationship to the preceding and succeeding bars. The link belt is continuous, and adapted to pass over sprocket wheels 22, which are suitably driven externally in any convenient manner. Beneath the tables 15 are disposed heating devices which vary in nature according to the type of grain under treatment. As shown in Fig. 1 the heating device 23 is electric, in which resistance elements are arranged in such manner that the heat is carried to the table 15 above, and to the mass being dried on the surface of the table 15 below.

In Fig. 2 the heating means is shown as a series of pipes 23a within which a fluid such as steam or hot oil is caused to circulate.

In operation of the apparatus above described, the grain under treatment is fed into the hopper 2, through the rolls 1 over the scraper 4 and on to the shaking table 5, from whence the laminated product is similarly fed to the second or third pair of rolls 3 by means of the delivery plate or plates 10. The product from the rolls 3 enters the hopper 12 which is of a like width to the width of the tables 15, and delivers the mass under treatment in an even and continuous stream over the whole width of the table. The mass is progressed forward by movement of the conveyor bars 19 which simultaneously in movement produce a corrugated surface on the mass, and thus provide the maximum surface which can be subjected to radiant heat from the heating device above. The conveyor bars 19 progress the mass forward, and it falls from one table to another, where, by reference to Fig. 1 it will be seen that the direction of motion over each successive table is reversed. In order to have a positive feed, several conveyor bars 19a engaging the surface of the table may be inserted in the conveyor chain length. As it is important that no portion of the mass under treatment escapes from the tables, the conveyor bars engage the side pieces 16 and prevent escape of the grain sideways of the belt.

In order to produce sterilization, it is essential that a temperature of 100 deg. C is attained at some point or other by every particle progressed through the oven and to achieve this the temperature of the tables 15 should be raised to at least 120° C. the moisture or other volatile content being extracted as produced. To this end every compartment of the oven constituted by the tables 15 is provided with a vapour pipe 25 leading to a suction trunk 26 which terminates in an exhaust fan or equivalent 27 where the vapours are discharged. In this manner the mass under treatment is continuously progressed from the inlet to the outlet until the final product at a temperature of at least 100° C. issues at the hopper 18 for cooling and subsequent storage.

I claim:—

1. The process for the treatment of cereals for human and animal consumption which consists in a preliminary cleansing process, a rolling process to produce a flake, passing the flakes flatwise to a further rolling operation which destroys by crushing ova or larvæ contained in the cereal and the immediate delivery of the finally crushed product to a heat sterilizing device in which said product is maintained in continuous movement and in which moisture is removed as liberated, the temperature of the heat sterilization device being kept below that which is excessively destructive to the vitamin content of said cereal.

2. A process for the treatment of cereals for animal and human consumption which comprises crushing said cereal between crushing rolls to form a laminated product, shaking the crushed cereal on a shaking table, to evenly distribute the laminated product and cause the laminations to lay flatwise, passing said cereal as evenly distributed in flatwise laminations between very closely set secondary crushing rolls to crush and disintegrate any ova or larvæ in said cereal, and progressing said cereal thus crushed through a sterilizing oven while agitating the cereal to expose every particle thereof to sterilizing heat, the temperature of said oven being kept below that which would substantially destroy the vitamin content of said cereal.

3. The process for the treatment of cereals for human and animal consumption which comprises first crushing and thereby destroying any ova or larvæ contained in the cereal and then destroying fungoid growths, fermentive bacteria and the like by applying sterilizing heat which is destructive to said growths, bacteria and the like but is not substantially destructive to the vitamins and other nutritive properties of the cereal.

4. The process for the treatment of cereals for human and animal consumption which comprises first disintegrating and thereby destroying any ova or larvæ contained in said cereal by rolling the cereal to extreme thinness, applying heat during part of the rolling treatment, and then while agitating the rolled cereal applying sterilizing heat to the rolled cereal to destroy any fungi, fermentive bacteria and the like in the cereal and to drive off excess moisture, said heat applied during rolling and sterilization being in the neighborhood of 100° C., thereby making said cereal sterile while avoiding the application of high temperatures unfavorable to vitamins and other nutritive properties of said cereal.

5. The process for the treatment of cereals for human and animal consumption which comprises crushing and thereby destroying any ova or larvæ contained in the cereal by uniformly rolling the cereal to extreme thinness and then destroying deleterious fungi, fermentive bacteria and the like by sterilization in an oven wherein the rolled cereal is maintained in agitation and heated uniformly and liberated moisture is removed, said cereal thereby being rendered sterile while at no time during rolling or subsequent heating being subjected to a temperature substantially destructive to vitamins and other nutritive properties contained in the cereal.

6. A method of treating cereals for animal and human consumption consisting in the preliminary production of a laminated product, in subjecting said product to a shaking operation whereby it is fed evenly to secondary crushing devices which crush the cereal so as to destroy by crushing ova or larvæ contained in the cereal and in subjecting the crushed grain to combined heat and mechanical treatment whereby each particle is exposed to a sterilizing temperature.

7. A process for the treatment of cereals for animal and human consumption which comprises subjecting the cereal to preliminary and secondary crushing operations of such severity as to destroy by crushing ova and larvæ in the cereal and sterilizing the crushed cereal without employing temperatures excessively destructive to vitamins in said cereal in an oven through which the crushed cereal is fed and giving the cereal within the oven a corrugated surface to aid in the sterilization of the crushed cereal at the temperature employed.

8. A process for the treatment of cereals for animal and human consumption comprising subjecting said cereal to primary and secondary crushing operations of such severity as to destroy by crushing ova and larvæ in the cereal and sterilizing the crushed cereal without employing temperatures excessively destructive to vitamins in the cereal in an oven in a series of superimposed trays within said oven and automatically feeding the crushed cereal across all the trays whilst exposing it to a sterilizing temperature.

9. In a method for the treatment of cereals for animal and human consumption the steps comprising destroying ova and larvæ in said cereal by preliminarily crushing said cereal to form a laminated product and then evenly distributing the laminations of said laminated product flatwise into a secondary crushing operation to further crush said laminations to such thinness that ova and larvæ in said cereal are destroyed by said secondary crushing operation.

10. Apparatus for the treatment of cereals for animal and human consumption which comprises primary crushing rolls adapted to produce a laminated product, secondary crushing rolls, and a shaking table between said primary and secondary crushing rolls adapted to cause the laminations of said laminated product to be introduced evenly and flatwise into said second crushing rolls, said second crushing rolls being so closely set as to be adapted to destroy by crushing ova and larvæ in said cereal as said laminations are passed through said secondary crushing rolls.

DAVID IDWAL THOMAS.